(12) United States Patent
Lavoie et al.

(10) Patent No.: US 8,032,602 B2
(45) Date of Patent: Oct. 4, 2011

(54) PRIORITIZATION OF RECIPIENT EMAIL MESSAGES

(75) Inventors: Jason D. Lavoie, Littleton, MA (US); Javed Rahman, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 12/372,846

(22) Filed: Feb. 18, 2009

(65) Prior Publication Data

US 2010/0211644 A1    Aug. 19, 2010

(51) Int. Cl.
G06F 15/16    (2006.01)
(52) U.S. Cl. .................. 709/206; 709/238; 709/245
(58) Field of Classification Search .................. 709/206, 709/238, 245
See application file for complete search history.

(56) References Cited

U.S. PATENT DOCUMENTS

| | | | |
|---|---|---|---|
| 5,694,616 A | 12/1997 | Johnson et al. | |
| 6,522,421 B2 | 2/2003 | Chapman et al. | |
| 6,587,549 B1 | 7/2003 | Weik | |
| 6,654,787 B1 | 11/2003 | Aronson et al. | |
| 6,735,593 B1 | 5/2004 | Williams | |
| 6,816,884 B1 | 11/2004 | Summers | |
| 6,832,244 B1 | 12/2004 | Raghunandan | |
| 6,836,792 B1 | 12/2004 | Chen | |
| 6,873,985 B2 | 3/2005 | Newman | |
| 6,925,605 B2 | 8/2005 | Bates et al. | |
| 6,941,346 B2 | 9/2005 | Engstrom | |
| 6,957,259 B1 | 10/2005 | Malik | |
| 7,054,906 B2 | 5/2006 | Levosky | |
| 7,653,606 B2 * | 1/2010 | Loughmiller et al. .......... 706/20 |
| 2007/0168430 A1* | 7/2007 | Brun et al. .................... 709/206 |
| 2007/0253412 A1* | 11/2007 | Batteram et al. .............. 370/389 |
| 2008/0147818 A1* | 6/2008 | Sabo ............................. 709/206 |
| 2008/0270560 A1* | 10/2008 | Tysowski et al. ............. 709/207 |
| 2009/0150507 A1* | 6/2009 | Davis et al. ................... 709/207 |

OTHER PUBLICATIONS

ClearContext Corporation, "ClearContext Inbox Manager for Microsoft Outlook: Designing a More Effective Inbox", Mar. 2004, pp. 1-4.*
"Clear Context Inbox Manager for Microsoft Outlook: Designing a More Effective Inbox," [online] Clear Context Corporation, Mar. 2004, [retrieved Feb. 18, 2009] retrieved from the Internet: <http://www.clearcontext.com/resources/attachments/Designing_a_More_Effective_Inbox.pdf>.

* cited by examiner

*Primary Examiner* — Yasin Barqadle
*Assistant Examiner* — Van Kim T Nguyen
(74) *Attorney, Agent, or Firm* — Patents on Demand, P.A.; Brian K. Buchheit; Scott M. Garrett

(57) ABSTRACT

A conveyed set of recipient email messages can be identified. An event triggering the conveyed set of email message to be prioritized relative to each other can be detected. Responsive to the detected event, a priority score for each of the emails in the conveyed set can be determined based upon recipient specific criteria. The recipient specific criteria can be based upon recipient behavior regarding a set of previous email messages. The priority score can be calculated base upon prioritizing factors determined from patterns discovered in the recipient behavior regarding the set of previous email messages. At least one programmatic action can be performed based upon the determined priority scores of the email messages.

11 Claims, 4 Drawing Sheets

PRIORITIZATION OF RECIPIENT EMAIL MESSAGES

BACKGROUND

The present invention relates to the field of electronic mail, more particularly to the prioritization of recipient email messages based upon user behavior, a user's management chain, and other criteria.

Answering email has become an important part of most businesses. Many employees are required to respond to many emails during the day. For some employees, most of their day can be spent responding to and dealing with emails. It is important for employees to maximize the efficiency of their time when dealing with emails. One way for employees to optimize their efficiency is the prioritization of their emails. Currently, email senders can manipulate a priority field to mark the email as high or low importance. Although the senders can mark an email as a certain priority, the recipient may have a different idea of the priority of the email. The priority field cannot indicate a priority relative to the other emails present in a user's inbox because the sender has no knowledge of the emails in the recipient's inbox.

DETAILED DESCRIPTION

Figure 1:
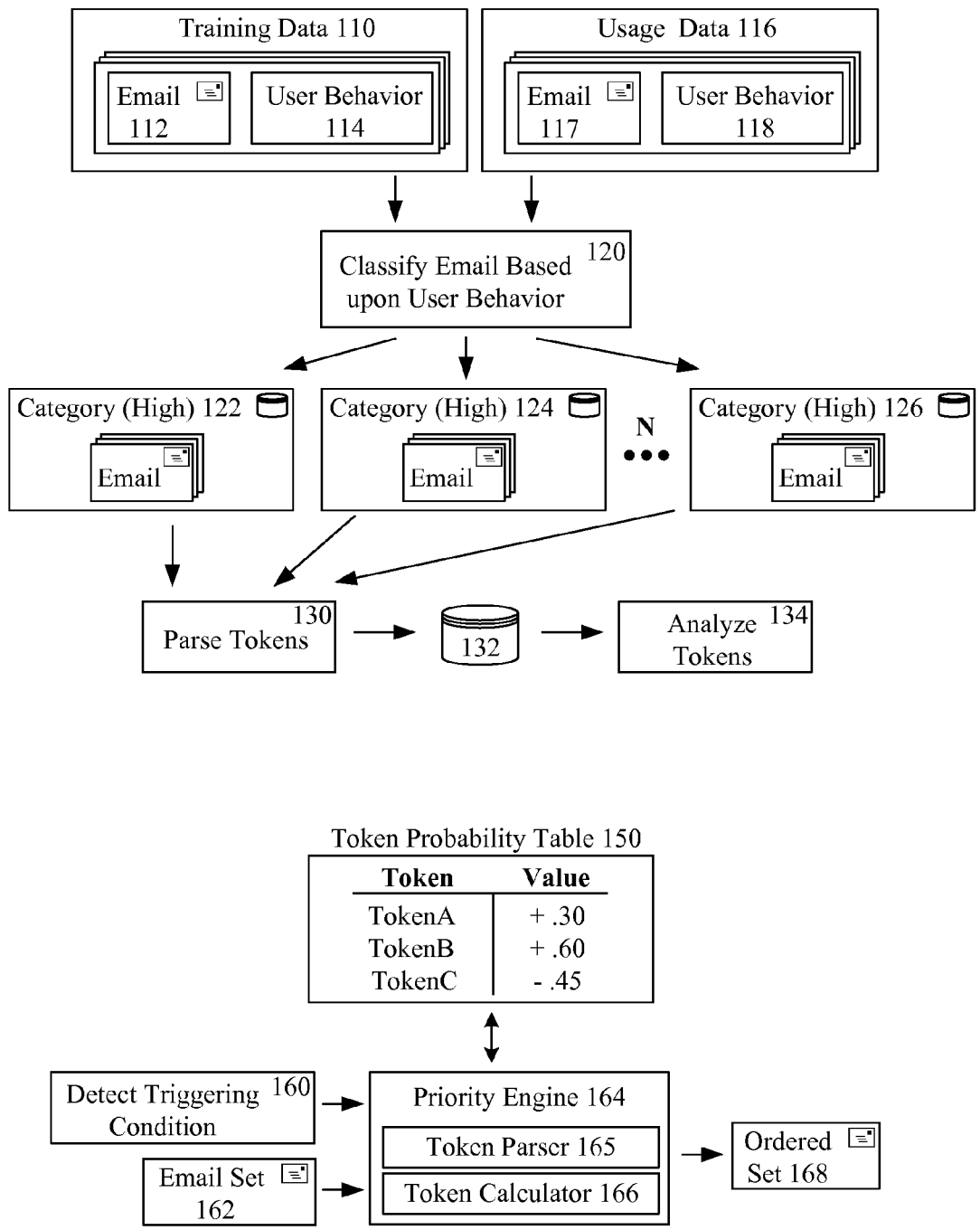
FIG. 1 is a flow diagram for prioritizing email based upon usage patterns in accordance with an embodiment of the inventive arrangements disclosed herein.

The present invention can enable the prioritization of a conveyed set of recipient email messages based upon recipient behavior, sender as it relates to the recipient, white lists, keywords, and other factors. The present invention can allow for the prioritization of the emails in a user's inbox to optimize the user's efficiency in dealing with and responding to their emails. User behavior can be determined based upon historic email responses. Patterns in these responses can be determined and defined. For example, tokens can be parsed from email messages and weights can be assigned to each token based upon statistical occurrences of these tokens in email messages. New email messages can be prioritized based upon past behavior (i.e., based upon token specific computations). As behavior patterns change, email priorities can change accordingly.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a flow diagram 100 for prioritizing email based upon usage patterns in accordance with an embodiment of the inventive arrangements disclosed herein. The usage patterns relate to historic handling of email messages by an email recipient. Initialization of the system can be based upon a set of training data 110. The training data 110 can include multiple email messages 112 and associated user behavior 114 for each message 112. In one embodiment, a sampling period, such as a month, can be defined for the training data 110 as a sufficient sample size to model user behavioral patterns.

In one embodiment, as new email data 116 is received, email messages 117 and associated user behavior 118 can be monitored. This new and constantly changing data 116 can affect prioritization criteria, which permits the system to self-adjust over time. Thus, as user behavior 118 regarding email 117 changes, prioritization factors can automatically change accordingly. In one embodiment, prioritization factors can be weighed so that newer data carries proportionally more weight than older data.

The behavior 114, 118 can be used to classify 120 the email messages 112, 117 into a set (1 . . . N) of distinct categories 122, 124, 126, which can be referred to generically as buckets. Each bucket 122, 124, 126 can represent a relative importance of a classified email message, which is determined from the user behavior. For example, one bucket 122 (a high priority one) can include email messages which were read and/or responded to rapidly (within a specific time period). Another bucket 124 (a low priority one) can include emails which were read and/or responded to after a specific period of time. Bucket 126 (junk email) can include emails which were deleted without being read. For simplicity of expression, a majority of examples described hereafter assume a two bucket 122, 124 implementation, where one bucket includes email messages having a positive influence on priority calculations and the other includes email messages having a negative influence on priority calculations. Nevertheless, any number of buckets 122, 124 126 and categories can be utilized and the disclosure is not to be construed as limited in this regard.

The email messages of the buckets 122, 124, 126 can be parsed 130 for tokens, which can be stored 132. For example, for each bucket 122, 124, 126 a count of occurrences of each token within included email messages can be computed, as shown by analyze token 134 process. For example, different hash tables can be established for each bucket 122, 124, 126. One to N number of hash tables can be used, each having different meanings.

Figure 2:
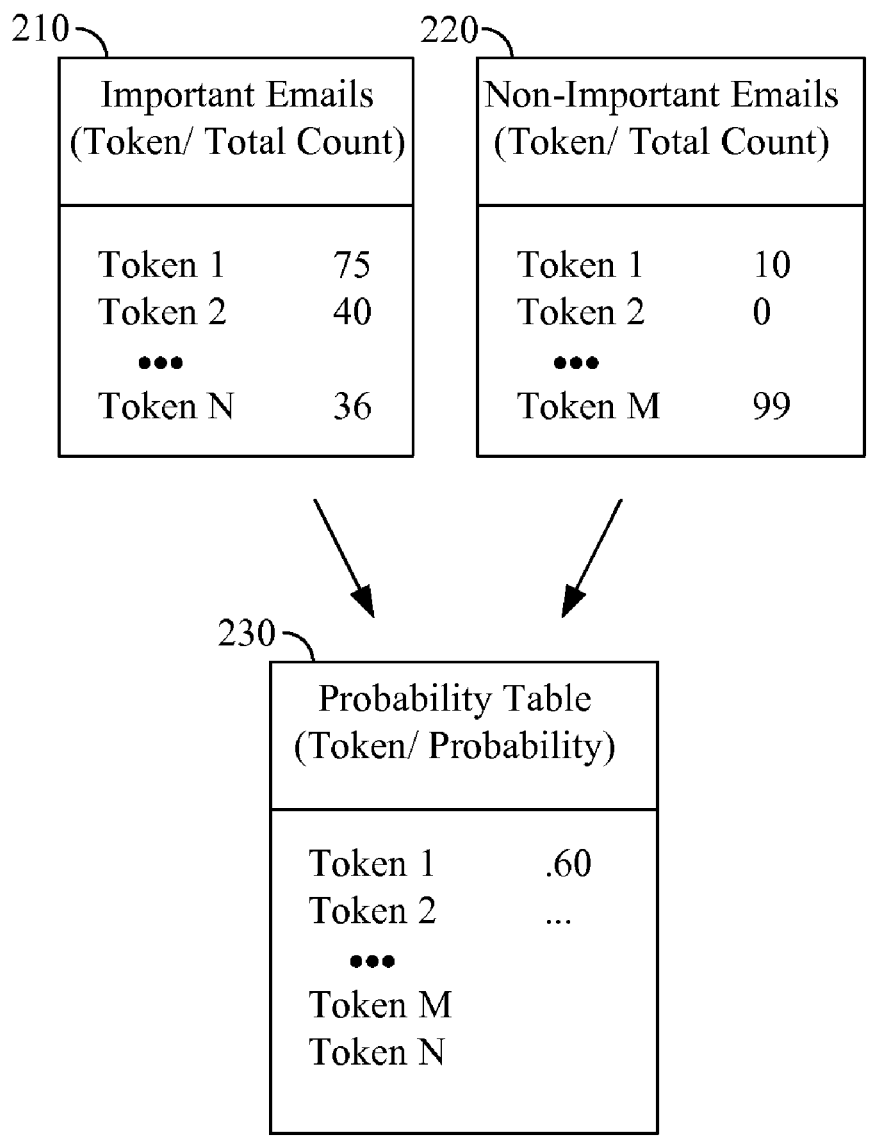
FIG. 2 shows an embodiment of a two hash table configuration.

FIG. 2 shows an embodiment 200 of a two hash table 210, 220 configuration. Table 210 can represent important tokens for related category. Table 220 can represent unimportant tokens. In other words, if a token appears a statically significant portion of the time in a bucket 122 based upon a count of occurrences within email messages of that bucket 122, that token can be considered an important token for that bucket 122, which was likely a factor in placing the email message in that bucket. If a token does not appear a statistically significant amount of times emails of bucket 122, that token can be considered an unimportant token for that bucket 122. Each token can be separately evaluated for each bucket 122, 124, 126. It should be appreciated that any number of hash tables (1 . . . N) can be utilized to categorize an importance of tokens within each bucket 122, 124, 126. Use of two hash tables is for convenience of illustration only and is not to be considered a limitation of the disclosure.

Hash table data can be utilized to create a probability table 150 (or table 230 of embodiment 200). In the probability table, the tokens can be assigned a score or influence value. A priority engine 164 can utilize the priority table 150 to prioritize an email set 160, which results in ordered set 168. For example, each email in the set 162 can be parsed for tokens by token parser 165. A token calculator 166 can determine a priority score for each message by summing token values and scores, as determined from table 150.

The prioritization by engine 164 can occur responsive to a detection of a triggering condition 160. Different triggering conditions 160 can include, but are not limited to, receipt of a defined quantity (1 . . . N) of email messages, a determination that a number of unread messages reaches a previously defined threshold, an instantiation of an email client, an occurrence of a designated repeating time (e.g., once an hour, once a day, etc.), a receipt of a user command to prioritize messages, and the like. Prioritization can occur as email messages arrive, as email messages are sorted, as email messages are deleted, or as otherwise arranged.

Tokens can represent a discrete unit of import with regard to email messages. Tokens can exist for different portions of a message, such as an address line (e.g., from, subject, to), a subject line, and/or a content body. Token selection schemes can be user and/or administrator configured. Furthermore, pattern matching techniques can be used based upon data 110, 116 to accurately detect statistically significant tokens within email messages. In one embodiment, selection criteria for tokens used by token parser 165 can vary over time, and can thus be updated and adapted to be consistent with user behavior 114, 118.

It should be appreciated, that processes can vary from those shown in diagram 100 and still be considered within scope of the invention. For example, hash tables 140, 142, 144 need not be explicitly utilized in all implementations. Instead a per token score for table 150 can be based upon other pattern matching computations, so long as a score is able to be associated with different tokens which indicates that tokens relative effect based upon user behavior 114, 118. In one embodiment, a portion of tokens can be defined and established manually at design-time or runtime. For example, an employer may wish to bias a prioritization of emails to emphasize client and/or project specific email messages, even when user behavior 114, 118 alone would result in personal messages receiving a relatively greater priority.

Figure 3:
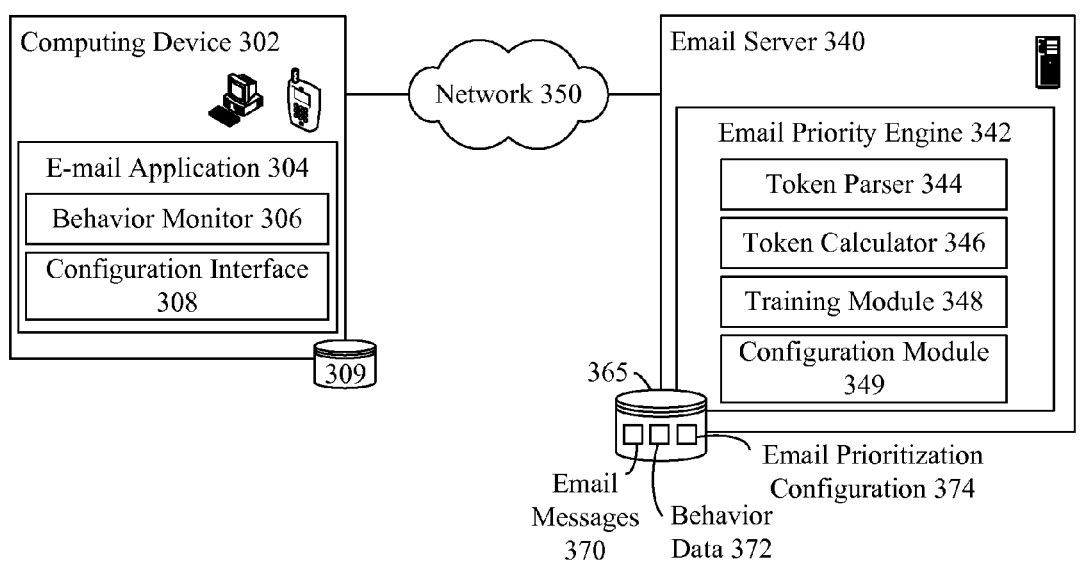
FIG. 3 is a schematic diagram of a system for prioritization of a conveyed set of recipient email messages based upon usage patterns in accordance with an embodiment of the inventive arrangements disclosed herein.

FIG. 3 is a schematic diagram of a system 300 for prioritization of a conveyed set of recipient email messages based upon usage patterns in accordance with an embodiment of the inventive arrangements disclosed herein.

In system 300, a computing device can be connected to an email server 340 via network 340. The device 302 can host an email application 304. An email priority engine 342 can compute which of a set of email messages 370 have a higher priority than other ones of the email messages 370. Computations of priorities can be in accordance with diagram 100 in one embodiment.

For example, token parser 344 can parse tokens from each email message 370. A token calculator 346 can determine a priority value for a set of tokens extracted from each email messages based upon a token probably table (e.g., table 150). Training module 348 can initialize values of the probably table based upon a set of training email messages and associated user behavior 372 for each of these messages. Email messages 370 and behavior data 372 can be digitally encoded in a data store 365 accessible by server 340.

In one embodiment, a client-side behavior monitor 306 can be used to record user behavior regarding received email messages, which is conveyed over network 350, optionally processed, and ultimately stored as behavior data 372. Data can be temporarily stored in a local data store 309 and conveyed to data store 365 in batch, in one contemplated embodiment.

In another embodiment, a configuration interface 308 can exist, which permits a user of device 302 to make changes to an email prioritization configuration 374. The email prioritization configuration 374 can affect values of the token probability table, which is used by the token calculator 346. Further, configuration 374 data can affect token selection criteria used by parser 344. Generally, the configuration 374 file can be specific to a user and can be used by a configuration module 349, parser 344, and/or calculator 346 to affect prioritization order of an email set. In one embodiment, the email prioritization configuration 374 data can dynamically change as behavior data 372 changes.

Computing device 302 can be any computing device that can run email application 304, which can be an email application enhanced with the ability to priority email in a user's inbox relatively. Computing device 302 can be capable of receiving email messages from email server 340 via network 350. Computing device 302 can be any computing device including, but not limited to, a desktop computer, a laptop computer, a mobile phone, a gaming console, and the like.

Email application 304 can be an email application enhanced with email priority engine 306 to prioritize emails. Email application 304 can provide a user with a graphical user interface (GUI) to retrieve messages from email server 340 and review them. The retrieved emails can be stored on data store 365. Email application 304 can also provide a user with a GUI to create new messages and send them, or reply to messages received.

Email server 340 can be a computing device configured to implement a protocol that can be used to receive and send email, such as post office protocol (POP), internet message access protocol (IMAP), simple mail transfer protocol (SMTP), and the like. Email server 340 can receive email messages for users and allow those users to retrieve these messages. Email server 340 can also allow users to send emails via the server. Email server 340 can be any computing device including, but not limited to, a server computer, a workstation, a laptop computer, and the like. Further, server 340 can include a cluster of more than one server as well as a virtual server implemented using virtualization technologies.

Email priority engine 342 can be implemented in software digitally encoded in a storage medium, such as data store 365. Functionality of engine 342 need not be implemented within a single computing device and can be distributed across multiple devices. For example, a portion of the functionality of engine 342 can be implemented in software executing on device 302. In one embodiment, a device (not shown) connected to network 350 can implemented one or more functional portions of engine 342 as a server, such as a Web service.

Data stores 309 and 365 can be physically implemented within any type of hardware including, but not limited to, a magnetic disk, an optical disk, a semiconductor memory, a digitally encoded plastic memory, a holographic memory, or any other recording medium. The data stores 309, 365 can each be a stand-alone storage unit as well as a storage unit formed from a plurality of physical devices, which may be remotely located from one another. Additionally, information can be stored within each data store 309, 365 in a variety of manners. For example, information can be stored within a database structure or can be stored within one or more files of a file storage system, where each file may or may not be indexed for information searching purposes.

Network 350 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 350 can include local components and data pathways necessary for communications to be exchanged among computing device components and between integrated device components and peripheral devices. The network 350 can also include network equipment, such as routers, data lines, hubs, and intermediary servers which together form a packet-based network, such as the Internet or an intranet. The network 350 can further include circuit-based communication components and mobile communication components, such as telephony switches, modems, cellular communication towers, and the like. The network 350 can include line based and/or wireless communication pathways.

Figure 4:
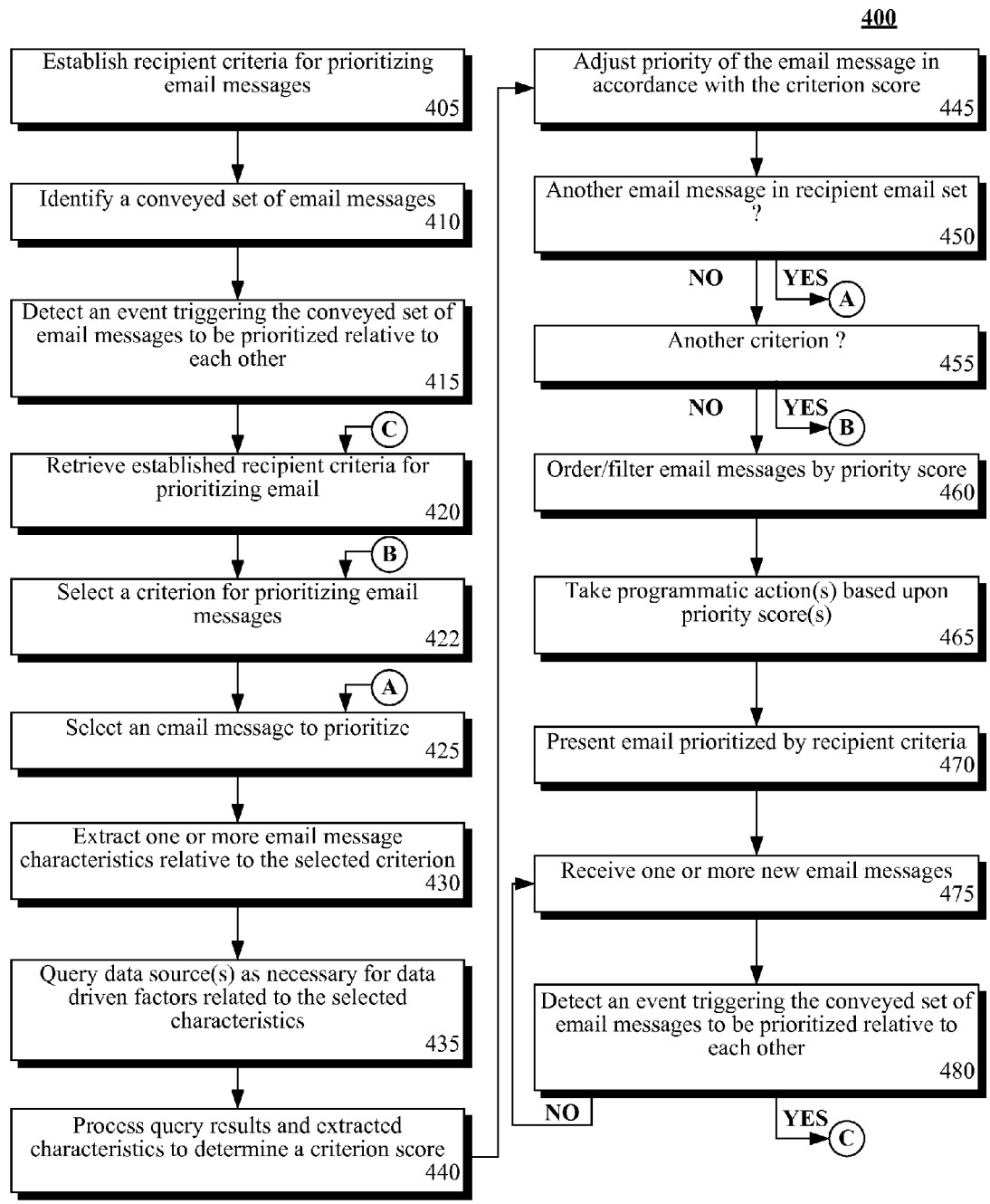
FIG. 4 is a flow chart of a method for prioritizing conveyed email messages based upon usage patterns in accordance with an embodiment of the inventive arrangements disclosed herein.

FIG. 4 is a flow chart of a method 400 for prioritizing conveyed email messages based upon user behavior in accordance with an embodiment of the inventive arrangements disclosed herein. Unlike traditional email prioritization techniques, method 400 uses recipient criteria (e.g., user behavior) to prioritize a set of email messages conveyed to a recipient relative to each other. This can be a dynamic set, where prioritization arrangements are adjusted when new email messages are received.

Any number and type of configurable criteria can be used, and the disclosure is not to be limited to the quantities and types of criteria expressed herein. The criteria can be based upon user behavior with a historic set of email messages and patterns detected within this behavior. Further, users and/or administrators can adjust criteria and/or conditions to bias prioritizing factors over others.

It should be understood that the method 400 is presented to express a concept of applying recipient criteria to a set of conveyed email messages and that specifics of the disclosure are not to be construed as constrained to exact processes and/or process flows shown. For example, in many implementations, it can be advantageous to group messages and/or criteria to quickly achieve a prioritized set of email messages, as opposed to processing each message and/or criteria one-by-one, as shown. A variety of optimizations are expected to be applied to many implementations, which are not expressly shown as exact optimizations appropriate for a given implementation can vary from situation to situation based upon implementation specific factors. A more specific implementation of method 400 is shown, for example, in diagram 100.

In method 400, a set of recipient criteria can be established for prioritizing email messages, as shown by step 405. The recipient criteria can be based upon user configured criteria, system established criteria, or a combination of the two. In one embodiment, user criteria can be configured using a user interface, such as a graphical user interface (GUI) of an email application. In step 410, a set of conveyed email messages can be identified.

In step 415, an event triggering the conveyed set of email messages to be prioritized relative to each other can be detected. For example, in one embodiment, a user can select a GUI interface control of an email application, which triggers the prioritizing event. In another embodiment, a previously established threshold can be reached (e.g., a previously defined quantity of received messages) can trigger the prioritization event. In still another embodiment, each received email message can be processed as it is received and a message specific priority score established. The received message can then be ordered within an email set based upon this priority score (i.e., using a quick sort or other algorithm to determine a suitable prioritized position for the received email message.)

Regardless of what triggers the event, once triggered recipient criteria for prioritizing email can be retrieved in step 420. Any number (one or more) of applicable criteria can be received step 420. The criteria can include tokens extracted from email messages and email priority scores computed based upon these tokens. In one embodiment, many different criteria can be available for user selection and a user can choose which (if any) prioritizing criteria are to be applied to received email sets. For example, one criterion can be a frequency of received/sent email messages from/to the sender. This can be used to establish a relationship strength between a sender and the recipient, where stronger relationships can be given a greater weight than weaker ones. Frequency of historic email is just one means for determining a relationship between sender/receiver, any of which can be used as a criterion for prioritizing email messages. For example, any social networking criteria, regardless of whether it is directly related to historic email conveyances can be used, as can other semi-static factors relating to relationships (e.g., relative positions/relationships in a semi-static organization hierarchy between the sender/recipient, familiar relationship, etc.), and the like.

In another example, a white-list/black list can be used as a prioritization criterion. For instance, one list (e.g., a white list) can include "important contacts" that should be associated with a relatively high priority, another list (e.g., a black list) can include "non-significant contacts" that should be associated with a relatively low priority, and so forth. In one embodiment, a white list can include a contact list from an address book. In still another example, semantic content of the subject heading/email body can be analyzed to determine an importance level of the received email message. In yet another example, a sender established priority (e.g., high, medium, low importance flags) can be a criterion for prioritizing email. Appreciably, the ultimate priority associated to a received email message can be very different from a priority value assigned by a sender.

Another criterion for prioritizing email can be based upon whether an email message includes any threaded discussions. For example, many email messages are forwarded and/or responded to, where each different message is considered a contribution to a threaded discussion. One prioritization criterion can be based upon a quantity of messages included in a threaded discussion, where the greater this quantity, the more important an email message is believed to be. Another prioritization criterion can be based upon a quantity or lack thereof of recipient participation within an email thread. For example, a thread having one or more recipient messages included can be considered as having a greater priority to a recipient than other email messages.

In step 422, a first one of the criteria can be selected for evaluation. For example, a criteria specific score can be calculated for each message, where these scores can be combined with other criteria scores to determine a prioritization score for each email message. In step 425, a first email message of the set of received messages being prioritized relative to each other can be selected.

In step 430, one or more email message characteristics can be extracted/determined from the selected email message. In step 435, one or more data sources can be queried as necessary to determine data driven factors related to the selected characteristic. For example, if the selected criterion is related to a relationship between sender/recipient, the queried data source can be one designed to determine a relationship/relationship strength between the sender/recipient. If the selected criterion is based upon semantic content, the queried data source can be a data store containing important (or non-important) key words. In step 440, query results and extracted email characteristics can be processed to determine a criterion score. A priority score of the email message can be adjusted in accordance with the criterion score in step 445.

When additional email messages are to be processed for the selected criterion, a next email message can be selected and processed, as shown by the method progressing from step 450 to step 425. Otherwise, all email messages for that criterion are processed, which can cause the method to progress from step 450 to step 455. In step 455, a determination can be made regarding whether additional criteria are to be processed to determine email priority scores. If so, the method can progress from step 455 to step 422. Otherwise, the method progresses from step 455 to step 460.

In step 460, email messages can be ordered/filtered by priority score. In step 465, one or more programmatic actions can be taken based upon the priority scores. For example, if a priority score is sufficiently high (relative to a previous established threshold) an email recipient can be automatically notified (e.g., through a pop-up message, an audible alert, etc.). In a priority score of one or more email messages is sufficiently low, the email message may be deleted and/or transferred automatically to a "junk" email folder. In one embodiment, a user can set a "maximum number" of messages to be received in a day/time period, in which case only those email messages having a greatest priority value (relative to other messages) can be shown regardless of whether the "non-shown" messages are considered "junk email" message. Appreciably, a next time received email messages are prioritized, previously non-presented messages can be presented, as their priority may be higher than other messages within a current received email queue. Any type and variety of programmatic action can occur in step 465 and the disclosure is not to be construed as limited in this regard.

In step 470, a set of prioritized email messages can be presented, such as through a user interface. In step 475, one or more new email messages can be received. In step 480, an event triggering a current set of email messages to be prioritized can optionally occur. If so, the method can progress from step 480 to step 420, where a current set of email messages can be prioritized based upon previously established criteria (which includes user behavior and priority factors computed based upon past user behavior). When no trigger occurs to prioritize, the method can continue receiving new email messages, as shown by progressing from step 480 to step 475.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for prioritizing a set of email messages comprising:
   identifying, via a computing device executing computer program instructions that are stored in at least one non-transitory storage medium, a conveyed set of recipient email messages conveyed to a recipient having a recipient unique email address;
   detecting, via a computing device executing computer program instructions that are stored in at least one non-transitory storage medium, an event triggering the conveyed set of email messages to be prioritized relative to each other;
   responsive to the detected event, determining, via a computing device executing computer program instructions that are stored in at least one non-transitory storage medium, a priority score for each of the emails in the conveyed set based upon behavior of the recipient with regards to a set of past email messages, wherein the priority score is further situationally calculated based at least in part on:
      a relative position of senders of the email messages for which the priority score is calculated within a reporting structure;
      a quantity of different messages associated with each of the email messages of the conveyed set, whereby hot threaded discussions are able to have a relatively greater priority score than email messages lacking a discussion thread; and
      semantic content criteria based upon the semantic content of at least one of the subject heading and email body of an associated one of the email messages, wherein the semantic content is compared against previous established content criteria to determine a sematic content criteria score;
   wherein said behavior was exhibited before the set of recipient email messages were conveyed to the recipient, wherein a correspondence is determining between each of the recipient email messages and the past email messages and priority determined for each of the recipient email messages is based on the correspondence with past email messages and the behavior exhibited by the recipient for the past email messages, wherein the behavior of the recipient comprises retention and deletion rates for email historically sent by a sender associated with each of the email messages of the conveyed set;
   performing, via a computing device executing computer program instructions that are stored in at least one non-transitory storage medium, at least one programmatic action based upon the determined priority scores of the email messages;
   receiving, via a computing device executing computer program instructions that are stored in at least one non-transitory storage medium, at least one email message after the performing of the at least one programmatic action, which results in a changed set of recipient email messages;
   detecting, via a computing device executing computer program instructions that are stored in at least one non-transitory storage medium, a second event triggering the changed set of conveyed email messages to be prioritized relative to each other;
   responsive to the second event, determining, via a computing device executing computer program instructions that are stored in at least one non-transitory storage medium, a priority score for each of the emails in the changed set based upon the behavior of the recipient; and
   performing, via a computing device executing computer program instructions that are stored in at least one non-transitory storage medium, at least one programmatic action based upon the determined priority scores of the email messages of the changed set.

2. The method of claim 1, wherein correspondence between each of the recipient email messages is determined by:
   parsing portions of the recipient email message into discrete segments, wherein the discrete segments are parsed from the address line, the subject line, and the content body of the email message;
   comparing the discrete segments with corresponding segments of the past email segments, wherein segment values for the behavior of the recipient are associated with each of the discrete segments; and
   computing the priority score by summing the segment values.

3. The method of claim 1, further comprising:
   for each of the email messages, parsing, via a computing device executing computer program instructions that are stored in at least one non-transitory storage medium, a plurality of previously defined tokens from the email messages;
   calculating, via a computing device executing computer program instructions that are stored in at least one non-transitory storage medium, a token score for each of the tokens, wherein the token score is based upon a token probability table computed from recipient behavior regarding a set of previously analyzed email messages; and
   determining, via a computing device executing computer program instructions that are stored in at least one non-transitory storage medium, the priority score based upon a summation of the calculated token scores.

4. The method of claim 3, further comprising:
   ascertaining, via a computing device executing computer program instructions that are stored in at least one non-transitory storage medium, a set of previous email messages and recipient behavior regarding each of the previous email messages, where the set of previous email messages and the recipient behavior are utilized as training data;
   quantifying, via a computing device executing computer program instructions that are stored in at least one non-transitory storage medium, prioritizing factors by analyzing the training data; and determining, via a computing device executing computer program instructions that are stored in at least one non-transitory storage medium, the priority score for each of the email messages using the quantified prioritizing factors.

5. The method of claim 4, further comprising:
classifying, via a computing device executing computer program instructions that are stored in at least one non-transitory storage medium, each email message of the set of previous email messages into a discrete set of defined categories;
parsing, via a computing device executing computer program instructions that are stored in at least one non-transitory storage medium, tokens present in the email messages of each defined category;
computing, via a computing device executing computer program instructions that are stored in at least one non-transitory storage medium, a category specific value for each parsed token; and
utilizing, via a computing device executing computer program instructions that are stored in at least one non-transitory storage medium, the category specific value of each parsed token when quantifying the prioritizing factors.

6. The method of claim 1, wherein the determining of the priority score is based upon at least one of:
values of a recipient specific white/black list;
a rate for responding to a type of content contained in email messages;
a rate of responding to specific senders of email messages; and
a relative position of senders of email messages within a reporting structure.

7. The method of claim 1, wherein the performing of the at least one programmatic action comprises:
presenting, via a computing device executing computer program instructions that are stored in at least one non-transitory storage medium, at least a portion of the conveyed set of email messages within a user interface of an email application used by a recipient of the email messages, wherein the presentation is ordered by the priority score.

8. The method of claim 1, wherein the detected event comprises at least one of a user command to prioritize received emails, a quantity of unread email messages in the conveyed set exceeding a previously defined threshold, and an instantiation of an email application configured associated with the set of recipient email messages.

9. The method of claim 1, wherein the behavior of the recipient comprises a rate and frequency of which the previous email messages are received from a sender associated with the each of the recipient email messages.

10. A computer program product for prioritizing a set of email messages comprising a non-transitory computer usable medium having computer usable program code embodied therewith, the computer program product comprising:
computer usable program code stored in at least one non-transitory storage medium configured to identify a conveyed set of recipient email messages conveyed to a recipient having a recipient unique email address;
computer usable program code stored in at least one non-transitory storage medium configured to detect an event triggering the conveyed set of email messages to be prioritized relative to each other;
computer usable program code stored in at least one non-transitory storage medium configured to, responsive to the detected event, determining a priority score for each of the emails in the conveyed set based upon behavior of the recipient with regards to a set of past email messages, wherein the priority score is further situationally calculated based at least in part on:
a relative position of senders of the email messages for which the priority score is calculated within a reporting structure;
a quantity of different messages associated with each of the email messages of the conveyed set, whereby hot threaded discussions are able to have a relatively greater priority score than email messages lacking a discussion thread; and
semantic content criteria based upon the semantic content of at least one of the subject heading and email body of an associated one of the email messages, wherein the semantic content is compared against previous established content criteria to determine a sematic content criteria score;
wherein said behavior was exhibited before the set of recipient email messages were conveyed to the recipient, wherein a correspondence is determining between each of the recipient email messages and the past email messages and priority determined for each of the recipient email messages is based on the correspondence with past email messages and the behavior exhibited by the recipient for the past email messages, wherein the behavior of the recipient comprises retention and deletion rates for email historically sent by a sender associated with each of the email messages of the conveyed set;
computer usable program code stored in at least one non-transitory storage medium configured to perform at least one programmatic action based upon the determined priority scores of the email messages;
computer usable program code stored in at least one non-transitory storage medium configured to receive at least one email message after the performing of the at least one programmatic action, which results in a changed set of recipient email messages;
computer usable program code stored in at least one non-transitory storage medium configured to detect a second event triggering the changed set of conveyed email messages to be prioritized relative to each other;
computer usable program code stored in at least one non-transitory storage medium configured to responsive to the second event, determining a priority score for each of the emails in the changed set based upon the behavior of the recipient; and
computer usable program code stored in at least one non-transitory storage medium configured to perform at least one programmatic action based upon the determined priority scores of the email messages of the changed set.

11. A computing device comprising hardware and software, wherein said software is stored on at least one non-transitory storage medium, wherein said hardware is operable to execute said software causing said computing device to:
identify a conveyed set of recipient email messages conveyed to a recipient having a recipient unique email address;
detect an event triggering the conveyed set of email messages to be prioritized relative to each other,
responsive to the detected event, determine a priority score for each of the emails in the conveyed set based upon behavior of the recipient with regards to a set of past email messages, wherein the priority score is further situationally calculated based at least in part on:

a relative position of senders of the email messages for which the priority score is calculated within a reporting structure;

a quantity of different messages associated with each of the email messages of the conveyed set, whereby hot threaded discussions are able to have a relatively greater priority score than email messages lacking a discussion thread; and semantic content criteria based upon the semantic content of at least one of the subject heading and email body of an associated one of the email messages, wherein the semantic content is compared against previous established content criteria to determine a sematic content criteria score;

wherein said behavior was exhibited before the set of recipient email messages were conveyed to the recipient, wherein a correspondence is determining between each of the recipient email messages and the past email messages and priority determined for each of the recipient email messages is based on the correspondence with past email messages and the behavior exhibited by the recipient for the past email messages, wherein the behavior of the recipient comprises retention and deletion rates for email historically sent by a sender associated with each of the email messages of the conveyed set;

perform at least one programmatic action based upon the determined priority scores of the email messages;

receive at least one email message after the performing of the at least one programmatic action, which results in a changed set of recipient email messages;

detect a second event triggering the changed set of conveyed email messages to be prioritized relative to each other;

responsive to the second event, determine a priority score for each of the emails in the changed set based upon the behavior of the recipient, and perform at least one programmatic action based upon the determined priority scores of the email messages of the changed set.

* * * * *